United States Patent Office 2,895,990
Patented July 21, 1959

2,895,990

PROCESS OF PRODUCING SODIUM OR POTASSIUM ACETATE, PROPIONATE OR BUTYRATE

Millard S. Larrison, Hackettstown, and John F. Henry, Rutherford, N.J.

No Drawing. Application December 9, 1957
Serial No. 701,318

14 Claims. (Cl. 260—540)

This invention relates to the preparation of substantially pure sodium and potassium salts of acetic, propionic and butyric acids.

Sodium and potassium acetates are useful in the pharmaceutical, photographic and textile fields; in the latter field as an intermediate in the production of dyestuffs. Sodium and potassium propionates are useful mould inhibitors and are also employed in animal husbandry. Sodium and potassium butyrate are used in the pharmaceutical field and in organic synthesis.

These salts heretofore have been produced by reacting an aqueous solution of sodium or potassium carbonate with an aqueous solution of the appropriate acid. The sodium or potassium salt thus formed in aqueous solution is recovered from the solution by crystallization or evaporation, including evaporation by spray-drying techniques.

The reaction between the sodium or potassium carbonate and the organic acid was considered by chemists generally as a classic example of a reaction involving ionized substances. Hence, it was considered necessary to dissolve the reactants in water to effect ionization thereof, employing for this purpose relatively dilute aqueous solutions.

The objections to these procedures are apparent. Among others, may be mentioned, the necessity of handling large volumes of aqueous solutions requiring equipment designed to accommodate such large volumes and the economic waste involved in the power losses for handling large volumes of material and evaporating the water when a spray-drying or other evaporation procedure is employed. Moreover, the products produced are usually contaminated and to meet C.P. standards must be subjected to a relatively costly purification treatment.

It is among the objects of the present invention to provide a process for producing the sodium or potassium salts of acetic, propionic and butyric acids in which sodium or potassium carbonate or bicarbonate is used as one of the reactants and which process is economical to carry out, resulting, as it does, in the direct production of relatively pure products and this without involving the handling of large volumes of water or other solvent.

It is another object of this invention to provide such process for producing the sodium or potassium salts of acetic, propionic or butyric acids in which the reactants are mixed to produce the desired metal organic salts without the addition of extraneous media, thus resulting in a marked saving in handling costs and space requirements for the equipment in which the reaction is conducted.

Still another object of this invention is to provide such process in which a commercial grade of sodium or potassium carbonate or bicarbonate may be reacted with the organic acid and obtain a product of satisfactory purity. This is an important feature of the invention. Commercial grades of sodium carbonate, for example, are of high purity, 99.7% or 99.8%. The use of such commercial grades results in a very material saving in the cost of the reactants and, moreover, results in the production of the desired pure product. Other sources of potassium of sodium ion, such for example, as pure caustic soda which will not introduce undesirable amounts of impurities in the final product, are much more costly than the commercial grades of sodium and potassium carbonate and bicarbonate.

It is another object of this invention to provide such process which results in a relatively pure product free of acid and unreacted carbonates.

Other objects and advantages of this invention will be apparent from the following detailed description thereof.

In accordance with this invention 1 mol of dry finely divided sodium or potassium carbonate or 2 mols of bicarbonate are mixed with at least 2 mols of acetic, propionic or butyric acid at a temperature within the range of just above 0° C. to below 100° C., desirably at room temperature, and after the reaction mixture has been thoroughly mixed it is heated to a temperature above 100° C., preferably above 135° C. for a period of time sufficient to drive off any unreacted acid. No water or other extraneous liquid is added to the reaction mixture. Surprisingly, by following this procedure, sodium or potassium acetate, propionate or butyrate, as the case may be, is produced in quantitative yields of high purity, free of acid and unreacted carbonate.

Commercial soda ash, or potassium carbonate, sodium bicarbonate or potassium bicarbonate may be used as one of the reactants. The use of the carbonate is preferred because its use makes the processing less difficult. The material used should have a particle size so that it passes through a 15 mesh screen, preferably material which passes through a 100 mesh screen. Commercial soda ash known as Grade No. 100, produced by the Westvaco Chlor-Alkali Division of the Food Machinery and Chemical Corp., which has the following screen analysis:

|  | Percent |
|---|---|
| Through 16 mesh screen | 100.0 |
| Through 40 mesh screen | 93.3 |
| Through 100 mesh screen | 16.0 |
| Through 200 mesh screen | 2.5 | provides a satisfactory reactant. A preferred reactant, however, is the commercial product known as Solvay light soda ash, of which 78% passes through a 100 mesh screen.

As the carbonate or bicarbonate, sodium or potassium bicarbonate, calcined sodium or potassium carbonate, sesquicarbonate and $Na_2CO_3 \cdot H_2O$ may be used. The salts mentioned are used in a dry finely divided state, which usually is the state in which they are sold as commercial products.

In the case of the acetate, when mixing a coarse material such as the above Grade No. 100, with the acetic acid, the mixture should be mixed thoroughly and allowed to stand for at least about four hours before the mixture of reactants are heated to above 100° C. to drive off any unreacted acid and produce the reaction product. This standing period is hereinafter referred to as the "incubation period" of the reaction. In general, the coarser the sodium or potassium carbonate or bicarbonate employed, the longer the incubation period.

In the case of the propionate, even when using a coarse sodium or potassium carbonate or bicarbonate, a very short incubation period, say one hour or less, need be used. In the case of the butyrate, the reactants can be mixed and immediately thereafter heated to a temperature above 100° C. In other words, no incubation period need be employed.

When using fine materials, e.g. material all of which passes through a 100 mesh screen, no incubation period need be employed even when making the acetate.

As noted, at least 2 mols of acid are mixed per mol of carbonate; in the case of the bicarbonate, at least one mol of acid is used per mol of bicarbonate. It is preferred to use a small excess of acid, say about 2% to 5% over and above the stoichiometric amount of 2 mols of acid per mol of carbonate or one mol of acid per mol of bicarbonate. More acid than this excess could be used if desired. This, however, would involve an unnecessary waste of acid. The acids used may be the commercially pure grades.

After mixing the reactants in dry state, i.e. without the addition of extraneous water or other liquid, at any desired temperature within the range of 1° C. to 99° C., preferably at room temperature (20° C. to 25° C.), and in those cases where an incubation period is employed, after this incubation period, the reaction mixture is heated to a temperature above 100° C., preferably above 120° C., but below the decomposition temperature of the desired reaction product to remove unreacted acid. In the case of the acetate, the reaction mixture should not be heated above 160° C.; the propionate and butyrate should not be heated above 180° C. This heating may be done by indirect heat exchange, or by blowing hot air or other inert gas through the reaction mixture. The temperature of the reaction mixture during the heating step is controlled to insure that the reaction mixture is not heated beyond the decomposition point of the desired product. In the case of the acetate the mixture may be heated to 125° C.–135° C. In the case of the butyrate, the temperature may be as high as 180° C., say from 160° C.–180° C. In the case of the propionate, the mixture may be heated to from 160° C.–180° C.

The following examples are given for illustrative purposes; it will be appreciated that this invention is not limited to these examples.

In these examples all "parts" are by weight.

*Example I*

106 parts of commercial soda ash were first broken up to eliminate large lumps by passage through a 16 mesh screen, then mixed with 176 parts of commercial butyric acid and the mixture stirred rapidly with a stainless steel stirrer. The mixture rapidly became pasty and then solidified. The mixing of the reactants was carried on for 25 minutes and thereafter the reaction mixture was heated to a temperature of 160° C.–170° C., which temperature was maintained for 5 minutes. A pure, white, low density solid consisting of substantially pure sodium butyrate was produced. The product dissolved readily in water (5 grams in 12.5 ml.) and gave a clear solution free of carbonate, free of butyric acid and having a pH of 8.

*Example II*

42 parts of commercial soda ash were mixed with 70 parts of commercial butyric acid over a 2 minute period. The mixture was stirred rapidly. A rapid reaction ensued with the mixture becoming solid in about 5 minutes. It was then removed, spread on aluminum trays and heated in a tray dryer at 125° C.–135° C. for 6 hours. The product was pure white and assayed 99.6% sodium butyrate which contained no carbonate or free butyric acid.

*Example III*

138 parts of commercial calcined potassium carbonate were mixed rapidly with 176 parts of commercial butyric acid. The reaction product was then heated to 170° C. for 10 minutes. A pure white product was obtained which contained no carbonate or free butyric acid.

*Example IV*

106 parts of commercial soda ash were first passed through a 16 mesh screen to remove lumps and the resultant finely divided material mixed with 176 parts butyric acid. The mixture was stirred rapidly for 5 minutes and then allowed to stand an additional 20 minutes. The mixture was divided into two portions, one of which was heated rapidly to 180° C. The heating required approximately 5 minutes. Upon testing the resultant material it was found to be free of carbonate and was substantially pure sodium butyrate. 5 grams of this product dissolved readily in 12.5 ml. of distilled water to give a clear white solution basic to litmus paper. The unheated portion, when tested, was found to contain considerable unreacted carbonate.

*Example V*

212 parts of Westvaco Grade No. 100 soda ash were mixed with 302 parts of DuPont refined grade propionic acid. Upon mixing, foaming took place. The mixture was stirred rapidly and at the end of 5 minutes became a thin paste. It was then allowed to stand for 25 minutes resulting in a thick pasty mass which was stirred and allowed to stand for 15 hours. At the end of this time a 5 gram sample was dissolved in 10 ml. of distilled water, producing a solution having a pH of 6.2. The addition of 1 ml. of 30% hydrochloric acid to this solution gave no evolution of carbon dioxide. The main portion of the reaction mixture was heated to 150° C. for 10 minutes. The resultant product assayed 99.8% sodium propionate. When 10 grams of this product was dissolved in 20 ml. of distilled water, it gave a clear white solution having a pH of 8.

*Example VI*

106 parts of Solvey light soda ash were mixed with 145 parts of refined propionic acid and the mixture stirred vigorously. A rapid reaction ensued with the formation of a pasty mixture which became thick and hard to stir. 5 minutes after the addition of the propionic acid to the soda ash the mixture became dry and granular. The reaction mass was allowed to stand for 20 minutes. Five grams of the resultant reaction mixture dissolved in 10 ml. water gave a small evolution of carbon dioxide gas; the solution had a pH of 6. The remainder of the reaction mixture was heated slowly to 160° C.; this heating continued for 20 minutes. The resultant product was found to be substantially pure sodium propionate. 5 grams of this product dissolved in 10 ml. distilled water with no evolution of carbon dioxide. The pH of the resultant solution was 7.5. Upon addition of acetic acid to the test solution to lower the pH to 5, no evolution of carbon dioxide took place.

*Example VII*

276 parts of potassium carbonate in the form of a calcined powder having a purity of 99.5% were mixed with 242 parts of 99.8% acetic acid. A rapid reaction ensued. The mass became solid almost immediately and the temperature rose to 76° C. within 4 minutes. The mixture was then allowed to stand for 48 hours and thereafter heated slowly to 150° C.–155° C. The heating period required approximately 30 minutes. There was thus produced a pure white crystalline product which assayed 99.7% potassium acetate. 10 grams of this product dissolved in 20 ml. distilled water gave no elvolution of carbon dioxide and produced a solution having a pH of about 7.5.

*Example VIII*

106 parts of commercial soda ash were mixed with 120 parts of A.C.S. grade acetic acid. A rapid reaction ensued. The mixture was stirred rapidly for about 5 minutes and in about 10 minutes thereafter became dry and granular. It was allowed to stand for 12 hours and then heated to 160° C. for 10 minutes. A pure white product free of carbonate was thus produced which assayed 99.7% sodium acetate. 5 grams of this product dissolved in 10 ml. distilled water produced a solution having a pH of 7.5.

Example IX 138 parts of calcined potassium carbonate were mixed with 122 parts glacial acetic acid. A rapid reaction ensued. Upon dissolution of 6 grams of the reaction product in 12.5 ml. of distilled water, frothing and gas evolution took place. The reaction mixture was then heated to a temperature of 160° C.; the heating was continued for 10 minutes. Upon dissolution of 6 grams of this reaction product in 12.5 ml. distilled water, no carbon dioxide evolution took place. The resultant solution was basic to litmus paper. No carbon dioxide evolution took place when the solution was treated with 20° Bé. hydrochloric acid.

Example X 84 parts of sodium bicarbonate and 60 parts of glacial acetic acid were mixed rapidly. A rapid reaction took place and the temperature dropped from 24° C. to 18° C. in 15 minutes; meanwhile the mixture changed from a thin slurry to a slightly damp solid. 27 minutes after the original mixing, external heat was applied and the temperature was raised to 125° C. during a 45 minute period. At the end of this time 5 grams of the resulting solid was dissolved in 10 ml. distilled water. Carbon dioxide was not evolved. The pH of the resulting solution was 7.5  2 ml. 20° Bé. hydrochloric acid was added to this solution with no evolution of carbon dioxide.

Example XI 100 parts of potassium bicarbonate and 60 parts of glacial acetic acid were mixed rapidly. A very vigorous reaction ensued immediately. The temperature dropped from 20° C. to 2° C. in 15 minutes and the product appeared as a hard white solid. 2 grams were dissolved in 5 ml. distilled water with copious evolution of carbon dioxide. External heat was then applied to the main lot of material and the temperature was raised to 140° C. in the course of one hour and held at about 140° C. until a dry product resulted. The final product met the National Formulary specifications for potassium acetate; testing as in the other examples showed it to be free of carbonate.

Example XII 84 parts sodium bicarbonate and 74 parts refined propionic acid were mixed at 18° C. A slow reaction started immediately and the temperature dropped at 11° C. during the next 35 minutes. During 100 minutes after first mixing, the mixture changed from a thin milky slurry to a sticky paste. On standing 6 hours a slightly sticky solid had formed. The temperature had ranged between 10° C. and 20° C. The mixture was held at room temperature for an additional 18 hours and then tested for unreacted carbonates with positive results. The mixture was then heated slowly (2½ hours) to 140° C. at which time no carbonates were present. 5 grams of the product dissolved readily in 10 ml. water with no evolution of carbon dioxide, pH of the solution was 7.5. On acidfying the solution with HCl and heating no carbon dioxide was evolved. The final product was a white, dry, solid which assayed 99.5% sodium propionate.

Example XIII 84 parts sodium bicarbonate and 88 parts butyric acid (99½% minimum) were mixed at 18° C. No reaction was evident. The mixture was then heated slowly. At about 35° C. evolution of carbon dioxide began. Heating was continued and the temperature gradually increased over a period of thirty minutes to 80° C. At this time the original milky slurry had changed to a waxy solid. Heating and mixing were continued until a temperature of 100° C. was reached 50 minutes after the initial mixing. 5 grams of the product were dissolved in water at this point with evolution of carbon dioxide. The pH of the solution was 5 to 6. During the next 25 minutes the temperature was increased to 160° C. 5 grams of the product were dissolved in 12.5 ml. distilled water. No carbon dioxide was evolved. The pH of the solution was 8. On the addition of the hydrochloric acid to this solution no carbon dioxide was evolved. The product was a white solid assaying 99.7% sodium butyrate.

The reaction can be practiced in any equipment which is resistant to the reaction products and the reactants. Stainless steel vessels and agitators or stirrers have been found eminently satisfactory.

It will be noted the present invention provides a simple, economical method of producing sodium and potassium acetate, propionate and butyrate starting with commercial grades of sodium or potassium carbonate or bicarbonate, which method is carried out without the addition of extraneous water or other diluent for the reactants. In that the process does not require the addition of water or other media for carrying out the reaction, it can be practiced in compact equipment occupying less space and greatly minimizes the labor and cost of handling the reactants and reaction products. It will be further noted that the present invention results in the direct production of high purity products.

Since changes in carrying out the process for producing metal salts of organic acids hereinabove described may be made without departing from the scope of this invention, it is intended that all matter contained in this description shall be interpreted as illustrative and not in a limiting sense.

What is claimed is:

1. A process of producing an alkali metal salt of an organic acid from the group consisting of acetic, propionic and butyric acids, which alkali metal is from the group consisting of sodium and potassium, which process comprises mixing a dry finely divided carbonate from the group consisting of carbonates and bicarbonates of said alkali metal with said organic acid substantially free of water and in about the stoichiometric proportions of said acid and said carbonate and in the absence of extraneous water and thereafter heating the reaction mixture to a temperature above 100° C. but below the temperature at which the reaction product decomposes until the reaction has gone to completion, and the reaction mixture is free of unreacted acid and carbonate.

2. A process as defined in claim 1, in which the amount of acid mixed with said carbonate is from 2% to 5% over and above the stoichiometric amount required for reaction with said carbonate.

3. A process as defined in claim 1 in which the reaction mixture is heated to a temperature within the range of 125° C.–180° C.

4. A process as defined in claim 1 in which the reactants are mixed at a temperature within the range of 1° C. to 99° C.

5. A process of producing the acetate of an alkali metal from the group consisting of sodium and potassium which comprises mixing a dry finely divided carbonate from the group consisting of carbonates and bicarbonates of said alkali metal with acetic acid substantially free of water and in about the stoichiometric proportions for the reaction of acetic acid with said carbonate, in the absence of extraneous water and at a temperature within the range of 1° C. to 99° C. maintaining the reaction mixture for at least 4 hours at said temperature and thereafter heating the reaction mixture to a temperature above 100° C. but below the temperature at which the said alkali metal acetate decomposes for a period of time sufficient to remove unreacted acetic acid and produce an alkali metal acetate free of carbonate and acetic acid.

6. A process of producing the acetate of an alkali metal from the group consisting of sodium and potassium which comprises mixing a dry finely divided carbonate from the group consisting of carbonates and bicarbonates of said alkali metal having a particle size such that substantially all of said carbonate passes through a 100 mesh screen with acetic acid substantially free of water and in the proportions of at least 1 mol of acetic acid per mol of said carbonate when said carbonate is a bicarbonate and in the proportion of at least 2 mols of acetic acid per mol of said carbonate when a carbonate is used, in the absence of extraneous water and at a temperature within the range of 1° C. to 99° C. and thereafter heating the reaction mixture to a temperature above 100° C. but below the temperature at which the alkali metal acetate decomposes for a period of time sufficient to remove unreacted acetic acid and produce an alkali metal acetate free of carbonate and acetic acid.

7. A process of producing the propionate of an alkali metal from the group consisting of sodium and potassium which comprises mixing a dry finely divided carbonate from the group consisting of carbonates and bicarbonates of said alkali metal with propionic acid substantially free of water and in the proportions of at least 1 mol of propionic acid per mol of said carbonate when said carbonate is a bicarbonate and in the proportion of at least 2 mols of propionic acid per mol of said carbonate when a carbonate is used, and in the absence of extraneous water, heating the reaction mixture to a temperature above 100° C. but below the temperature at which said alkali metal propionate decomposes for a period of time sufficient to remove unreacted propionic acid and produce an alkali metal propionate free of carbonate and propionic acid.

8. A process as defined in claim 7 in which the reaction mixture is heated to a temperature within the range of 120° C. to 160° C.

9. A process of producing the butyrate of an alkali metal from the group consisting of sodium and potassium which comprises mixing a dry, finely divided carbonate from the group consisting of carbonates and bicarbonates of said alkali metal with butyric acid substantially free of water and in the proportions of at least 1 mol of butyric acid per mol of said carbonate when said carbonate is a bicarbonate and in the proportion of at least 2 mols of butyric acid per mol of said carbonate when a carbonate is used and in the absence of extraneous water, and heating the reaction mixture to a temperature above 100° C. but below the temperature at which said alkali metal butyrate decomposes for a period of time sufficient to remove unreacted butyric acid and produce an alkali metal butyrate free of carbonate and butyric acid.

10. A process as defined in claim 9 in which the reaction mixture is heated to a temperature within the range of 130° C. to 170° C.

11. A process of making sodium butyrate which comprises mixing dry finely divided soda ash having a particle size such that it passes through a 15 mesh screen with butyric acid substantially free of water and in proportions of at least 2 mols of butyric acid per mol of soda ash, agitating the resulting mixture and heating the agitated mixture to a temperature of 160° C. to 170° C. to produce substantially pure sodium butyrate free of butyric acid and carbonate.

12. A process of producing sodium propionate which consists of mixing dry finely divided soda ash with propionic acid substantially free of water and in the proportions of at least 2 mols of propionic acid per mol of soda ash and agitating the mixture and heating the agitated mixture to a temperature of about 150° C. to produce substantially pure sodium propionate free of propionic acid and carbonate.

13. A process for producing sodium acetate which consists of mixing dry finely divided soda ash with acetic acid substantially free of water and in proportions of at least 2 mols of acetic acid per mol of soda ash, agitating the mixture and thereafter heating the resultant mixture to a temperature above 120° C. but below the temperature at which sodium acetate decomposes to produce substantially pure sodium acetate free of acetic acid and carbonate.

14. A process for producing potassium acetate which consists of mixing dry finely divided potassium carbonate with glacial acetic acid in the proportions of at least 2 mols of acetic acid per mol of potassium carbonate, agitating the mixture and thereafter heating the resulting mixture above 120° C. but below the temperature at which potassium acetate decomposes to produce substantially pure potassium acetate free of acetic acid and potassium carbonate.

References Cited in the file of this patent

UNITED STATES PATENTS

| 1,648,516 | Hochstetter | Nov. 8, 1927 |
| 1,857,520 | Stone | May 10, 1932 |

FOREIGN PATENTS

| 313,352 | Great Britain | June 13, 1929 |